Sept. 4, 1923.

N. C. OWEN 1,466,851

RAILROAD TIE CHANGING MACHINE

Filed Aug. 22, 1922     7 Sheets-Sheet 3

INVENTOR
Newton C. Owen
BY
A. I. Gardner
ATTORNEY

Sept. 4, 1923.

N. C. OWEN

RAILROAD TIE CHANGING MACHINE

Filed Aug. 22, 1922    7 Sheets-Sheet 5

INVENTOR
Newton C. Owen
BY
A. J. Gardner
ATTORNEY

Sept. 4, 1923.

N. C. OWEN 1,466,851

RAILROAD TIE CHANGING MACHINE

Filed Aug. 22, 1922   7 Sheets-Sheet 6

INVENTOR
Newton C. Owen
BY
A. I. Gardner
HIS ATTORNEY

Sept. 4, 1923.

N. C. OWEN

RAILROAD TIE CHANGING MACHINE

Filed Aug. 22, 1922   7 Sheets-Sheet 7

INVENTOR
Newton C. Owen
BY
A. J. Gardner
ATTORNEY

Patented Sept. 4, 1923.

1,466,851

UNITED STATES PATENT OFFICE.

NEWTON C. OWEN, OF WILKES-BARRE, PENNSYLVANIA, ASSIGNOR TO OWEN-PENNSYLVANIA CORPORATION, OF WILKES-BARRE, PENNSYLVANIA, A CORPORATION OF PENNSYLVANIA.

RAILROAD-TIE-CHANGING MACHINE.

Application filed August 22, 1922. Serial No. 583,494.

*To all whom it may concern:*

Be it known that I, NEWTON C. OWEN, a citizen of the United States, and a resident of Wilkes-Barre, county of Luzerne, and State of Pennsylvania, have invented certain new and useful Improvements in Railroad-Tie-Changing Machines, of which the following is a specification.

Some of the more important objects of the present invention are to provide a machine for removing and replacing railroad ties which, while possessing the necessary power for performing these functions, will be particularly light and easily handled so that it may be readily transported and quickly applied to and removed from the rails of the track; which will automatically and securely fasten itself to the rails and will apply the full power of which it is capable without distorting the rails; which will slide the ties beneath the rails with a minimum of friction between the two, and which, furthermore, can be applied to the track at any point without tripping the signal mechanism or block controls.

Other important objects are to apply the power in a way to force the tie in a direct straight path; to provide for the handling of irregularly shaped and broken or decayed ties as well as the more easily handled sound and straight ties; and to arrange for convenient operation of the machine by hand cranks or the like, and to provide other improvements as will appear hereafter.

In the accompanying drawings.

In the forms of the invention herein disclosed the body or base of the machine is made up of a rigid frame constructed of two channel bars 15 secured back-to-back in fixed spaced relation by channel members 16 and this frame is movably supported on the rails by small flanged rollers or wheels 17 journaled in brackets 18 projecting from the opposite sides of the frame. This particular construction combines lightness with strength and rigidity.

Figure 11:
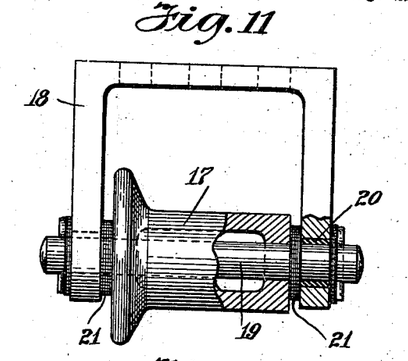
Figures 11 and 12 are broken side and end views respectively of one of the supporting wheels illustrating the manner in which it is insulated in the carrying bracket.
Figure 12:
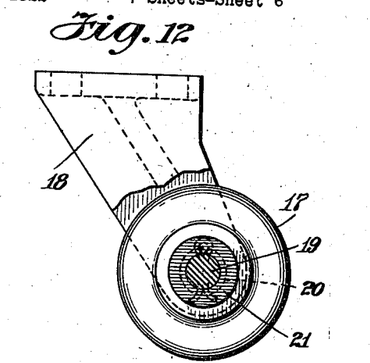
Figure 13:
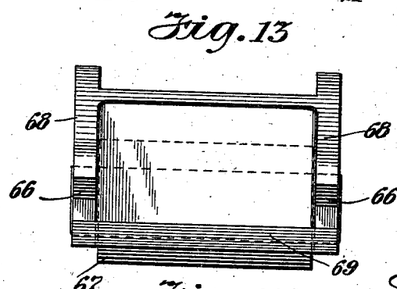
Figures 13, 14 and 15 are front, side and plan views respectively of a roller equipped form of skid like that illustrated in Figures 1 and 2.
Figure 14:
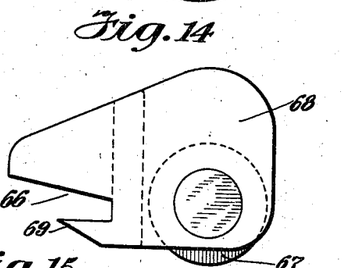
Figure 15:
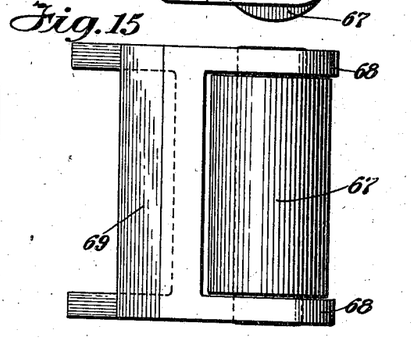
Figure 16:
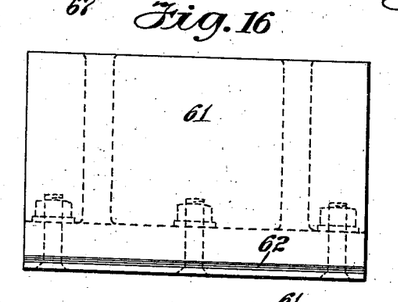
Figures 16, 17 and 18 are plan, face and end views respectively of one of the struts or thrust transmitting brackets.
Figure 17:
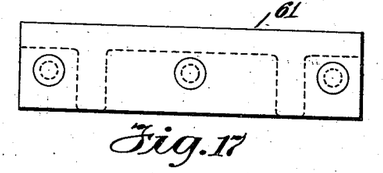

To prevent the machine from forming an electrical bridge across the rails the supporting rollers are shown as mounted on axles 19 supported in insulating bushings 20 in the arms of the brackets and as spaced at their ends from such arms by insulating flanges or washers 21 (Figures 11 and 12). The machine therefore when applied to the rails has no effect upon the track signals or electrical block controlling mechanism.

Mounted upon the supporting frame is the power device, herein disclosed as a cable carrying drum 22 operated by reduction gearing and mounted in a base or frame 23 which is slidably supported on the truck frame. This slidable carriage is shown as guided on the frame by having dependent flanges 24 extending down over the edges of the supporting structure and as having upstanding sides 25 providing journals for the two shafts 26, 27. The first of these shafts provides a bearing for the drum, which is loosely mounted thereon and has rigidly fixed thereon, at one end of the drum, a pinion 28 in mesh with a gear 29 fixed on the other shaft, which latter carries a pinion 30 in mesh with a gear 31 on the head of the drum. These shafts have protruding angular or otherwise suitably shaped ends 32, 33 to receive correspondingly shaped sockets of the operating levers 34. The levers being interchangeably engageable with the shaft ends it will be seen that the force may be applied at different speed ratios and as both ends of the shafts are exposed, the operating levers or cranks may be applied to either or both ends of one or both shafts. Consequently, the operating power may vary both in character and quantity.

Extending from the drum is shown a cable 35 which passes over a sheave 36 journaled on a pin 37 removably engaged in one of the bearings 38 provided therefor in the ends of the truck frame. From the sheave this cable passes beneath the rails and is connected with the tie.

The power puller may be operated by ratchet levers or cranks, the latter being desirable because of the continuous rotary motion which can be imparted thereby to the cable drum, as distinguished from the intermittent motion produced by the ratchet levers. To afford the necessary leverage these cranks should have a relatively long throw and to enable the use of such long throw cranks I have shown in Figures 1 and 2 how the puller may be elevated a sufficient distance above the track to provide clearance for the cranks. The means for this purpose is shown as a truss-like bridge structure 39 rested on the truck frame and having a flat top on which the puller base is slidably supported by having its dependent flanges 24 engaged over the edges of the same.

The intermediate support 39 is indicated as removably engaged upon the truck frame, being shown simply as rested on top of the same and having dependent flanges 40 fitting the inner faces of the beams 15, constituting the sides of the main frame. These flanges may simply be extensions of the lower gussets shown at 41 for securing together the angles of which this frame or pedestal is made, which latter thus has freedom for a certain amount of sliding movement on the truck, for purposes of self-adjustment.

Figure 3:
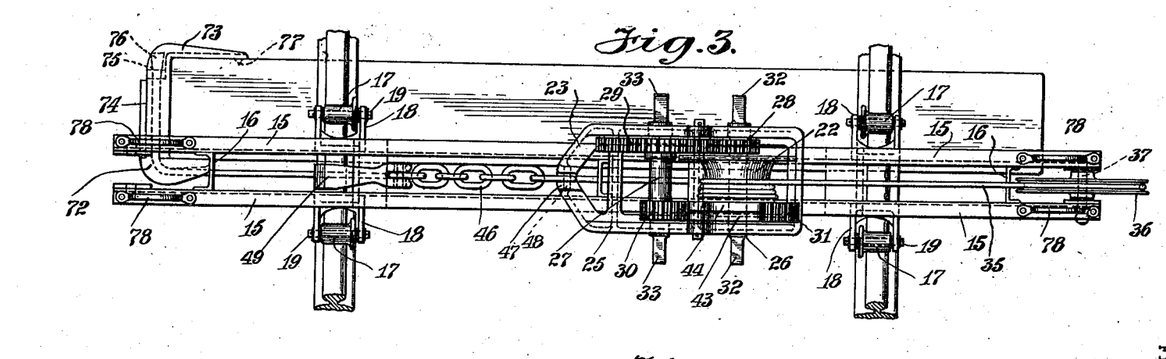
Figures 3 and 4 are plan and side views of a modified form of the invention.
Figure 4:
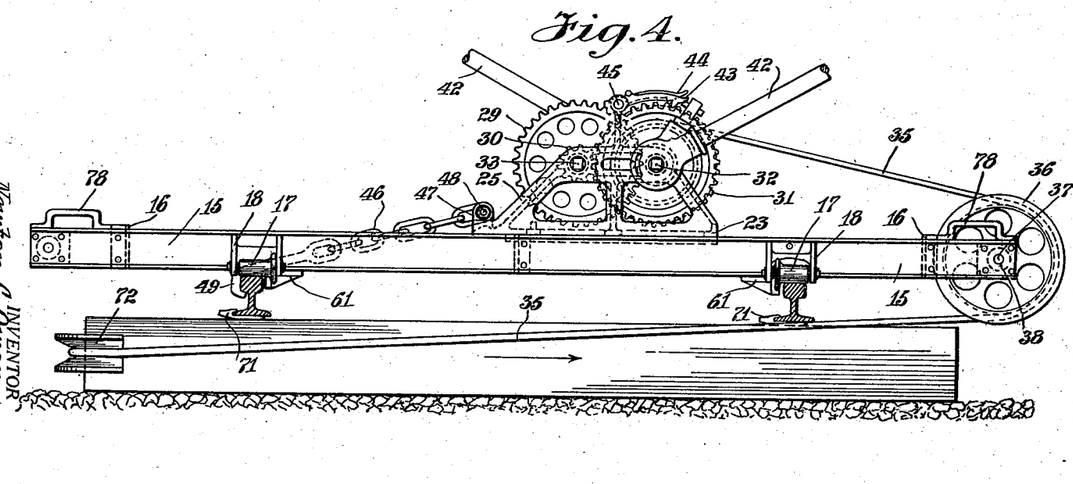

When it is not necessary or desirable to use the pedestal the same may be left off and the puller frame be directly supported upon the truck frame substantially as indicated in Figures 3 and 4, in which case the drum shafts may be turned by short cranks or by means of ratchet levers, such as shown at 42.

The drum is shown as held in the positions to which it is turned by pawls 43, 44 pivoted on the puller frame at 45 in position to engage the teeth of the drum gear 31, and stepped one a half tooth in advance of the other so that one or the other will be always ready to take hold of the drum.

In using the apparatus the puller frame is preferably anchored directly to one of the rails as by means of a chain 46 having one of its links caught between a pair of upstanding ears 47 at the rear end of the puller frame and held by an inserted pin or bolt 48, said chain carrying at its opposite end a hook 49 shaped to engage beneath the ball of the rail, or in some cases, as at rail joints, with the base of the rail.

Figure 1:
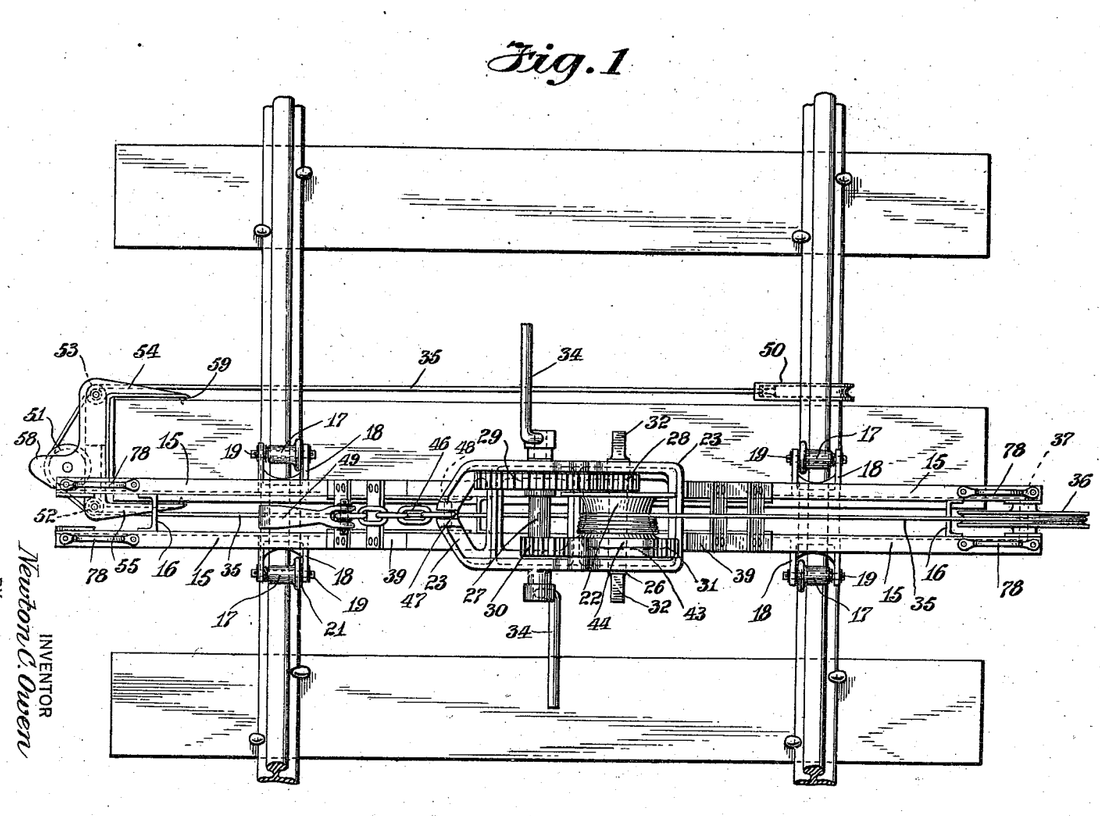
Figure 1 is a top plan view of a tie changing machine constructed in accordance with and embodying features of this invention.
Figure 2:
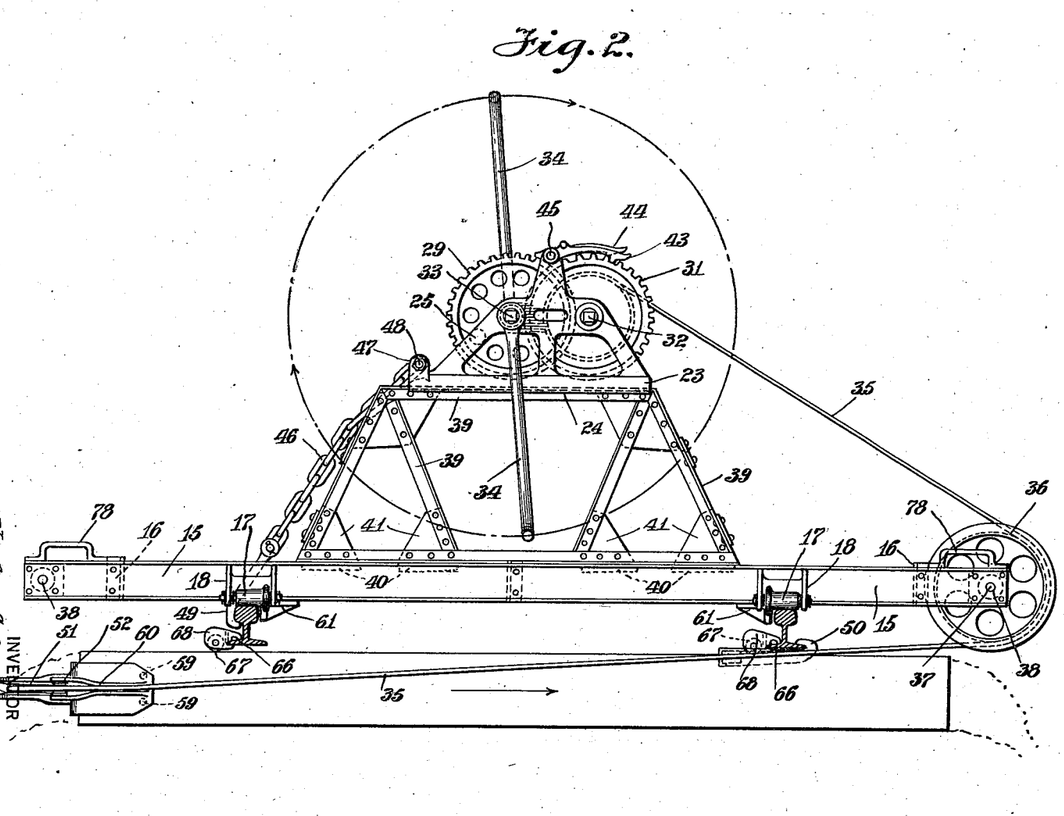
Figure 2 is a side elevation of the same as applied to the rails of a track and in the act of pulling a tie.
Figure 19:
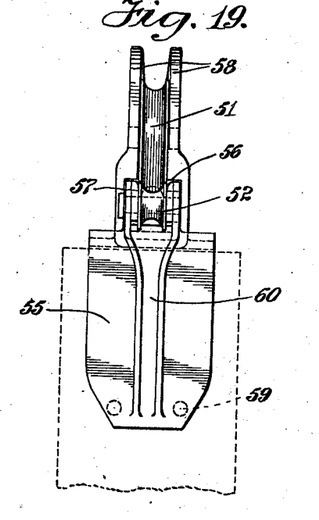
Figures 19 and 20 are edge and plan views respectively of the telescopic tie engaging hook shown in Figures 1 and 2.
Figure 20:
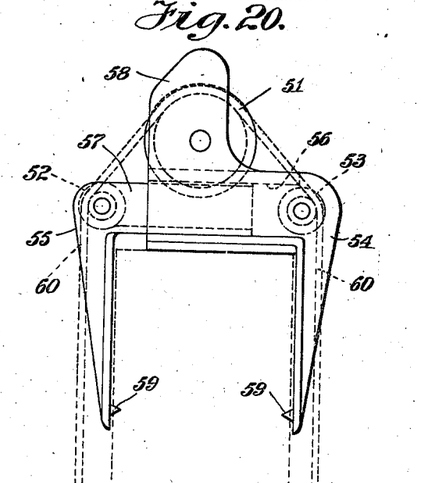

In order to get a straight line pull on the tie there is shown in Figures 1 and 2 how the pulling cable may be extended about the end of the tie and secured to the far rail so that the tie will in effect be caught in a loop of the cable having its side lines arranged at opposite sides of the tie. For this purpose the end of the cable is shown equipped with a detachable hook 50 for engagement with the foot of the rail and the bight of the cable is passed about an intermediate pulley 51 and two corner pulleys 52, 53 mounted in a special hook applied to the end of the tie. This hook, for purposes of adjustment to different sizes and configurations of ties (see particularly Figures 19 and 20), is constructed of two telescopically engaged angular hook sections 54, 55, each adapted to engage about a corner of the tie and carrying one of the corner pulleys (52, 53), the first of these sections having a guideway 56 positioned to extend crosswise at the end of the tie and the other section having a shank portion 57 slidingly fitting in such guideway. The end or intermediate pulley 51 is shown as journaled between cable guiding lugs 58 carried by the first hook section and the ends of both hook sections are shown equipped with points 59 which are forced by the pressure of the cable into the sides of the tie. Both hook sections are preferably made relatively wide, as shown particularly in Figure 19, so as to gain a firm grip on the tie and prevent tipping of the hook and the sections are, furthermore, usually constructed with cable guiding grooves 60 in the sides thereof.

The tie hook is easily applied by simply forcing the two sections together across the end of the tie, a firm engagement being assured by the pull of the cable against the corners of the collapsibly related sections. The closing force of the cable thus makes the hook practically self-adjusting and enables it to fit itself to different shapes and conditions of ties.

To relieve the truck wheels of thrust and cause the thrust of the truck frame to be directly transmitted to the rails, the frame is shown as equipped with rigid brackets 61 at the under sides of the same positioned to engage the inner faces of the rail heads (see particularly Figures 2 and 4). It will be seen from the views referred to that when the cable is put under tension the pull on the sheave 36 will impart a thrust to the truck frame, toward the left in Figures 2 and 4, which will be directly transmitted to the rail by the engagement of the left hand thrust shoulder with the head of the rail. This arrangement has the further advantage of in effect "clamping" the truck frame to the track, the head of the rail being gripped between the anchorage hook 49 at the outer face and the thrust shoulder 61 at the inner face thereof.

Figure 18:
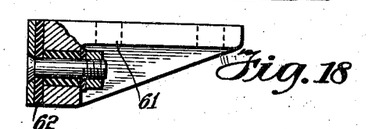

While the truck is normally insulated from both rails by reason of the insulating mounting of the supporting wheels, it frequently happens that the cable pulls up against the under side of the rail nearest the sheave and thus establishes electrical connections between the truck frame and one rail. To prevent the thrust shoulder and anchorage connection establishing contact with the opposite rail and thus electrically connecting the two rails, the thrust bracket is usually insulated from the rail by placing a metal shod strip of hard insulating fiber 62 on the face thereof and the conductivity of the chain is broken at some point as by mounting the pin 63 of the hook in insulating bushings 64 and providing insulating washers 65 on said pin at opposite sides of the end link of the chain which is engaged with such pin (see particularly Figures 18, 21 and 22).

To reduce friction between the ties and rails, skids may be inserted between the tops of the ties and the foot of the rails, or ordinary track jacks may be used either alone or with the skids. In a preferred construction, illustrated particularly in Figures 2, 13, 14, 15 and 23, these skids are each notched or recessed as indicated at 66 forming in effect, jaws to fit over the flange of the rail and carry a roller 67 journaled between spaced side walls 68 and projecting below the body of the skid for engagement with the face of the tie. These skids are shown constructed with wedges 69 at their lower entering edges so that they can readily be driven between the foot of the rail and the adjacent surface of the tie, if desired, or necessary, and which, with the jaws, prevent the skids from tilting.

Figures 21, 22, 23:
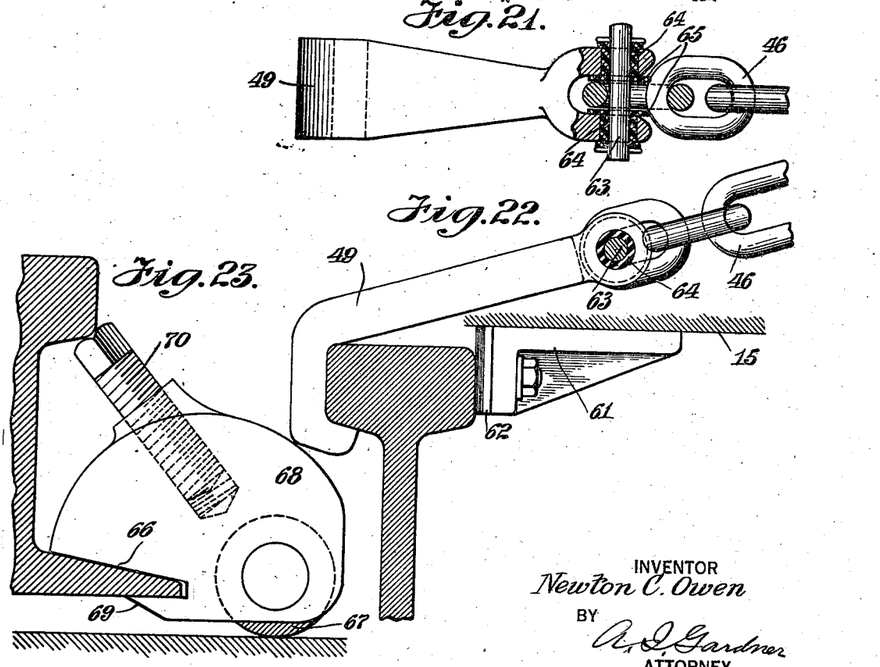
Figure 21 is a partly sectional plan view of the anchorage hook illustrating the manner in which it is insulated from the truck or supporting carriage.
Figure 22 is a part sectional side view showing how this hook engages with one side of the rail head while the thrust transmitting element engages the opposite side of the same rail.
Figure 23 illustrates a modified form of skid equipped with an adjustable element for contacting the head of the rail.

The skid shown in Figure 23 is modified to the extent that it is provided with a screw bolt 70 projecting angularly toward the ball of the rail and adjustable to bring its head into contact with the under side of the ball. This evens the pressure on the rail and by preventing tilting of the skid, takes some of the stress off the rail flange engaging jaws at 66.

In the modified form of skid illustrated in Figures 4, 8, 9 and 10, the wedge point and hook features are retained as indicated by the use of corresponding reference characters, but the roller is omitted and in place of that the skid is formed at its under surface with friction reducing flat ribs 71, and a taper 71$^a$ at the rear or tie engaging face thereof.

Where the ties are not too firmly embedded the pulling cable may be directly connected with the end of the tie, as indicated in Figures 3 and 4. In such a case a simpler form of tie hook may be employed consisting of two angular hook members 72, 73, having a telescopic connection across the end of the tie, as indicated at 74, and the second of these members having a socket at 75 receiving a ferrule or head 76 on the end of the cable. The cable extending from this point of anchorage about the corner of the other member serves to bring the two members together into firm clamping engagement about the end of the tie, which engagement is made more secure by the provision of one or both of the hook elements with prongs 77 to bite into the side of the tie.

Figure 5:
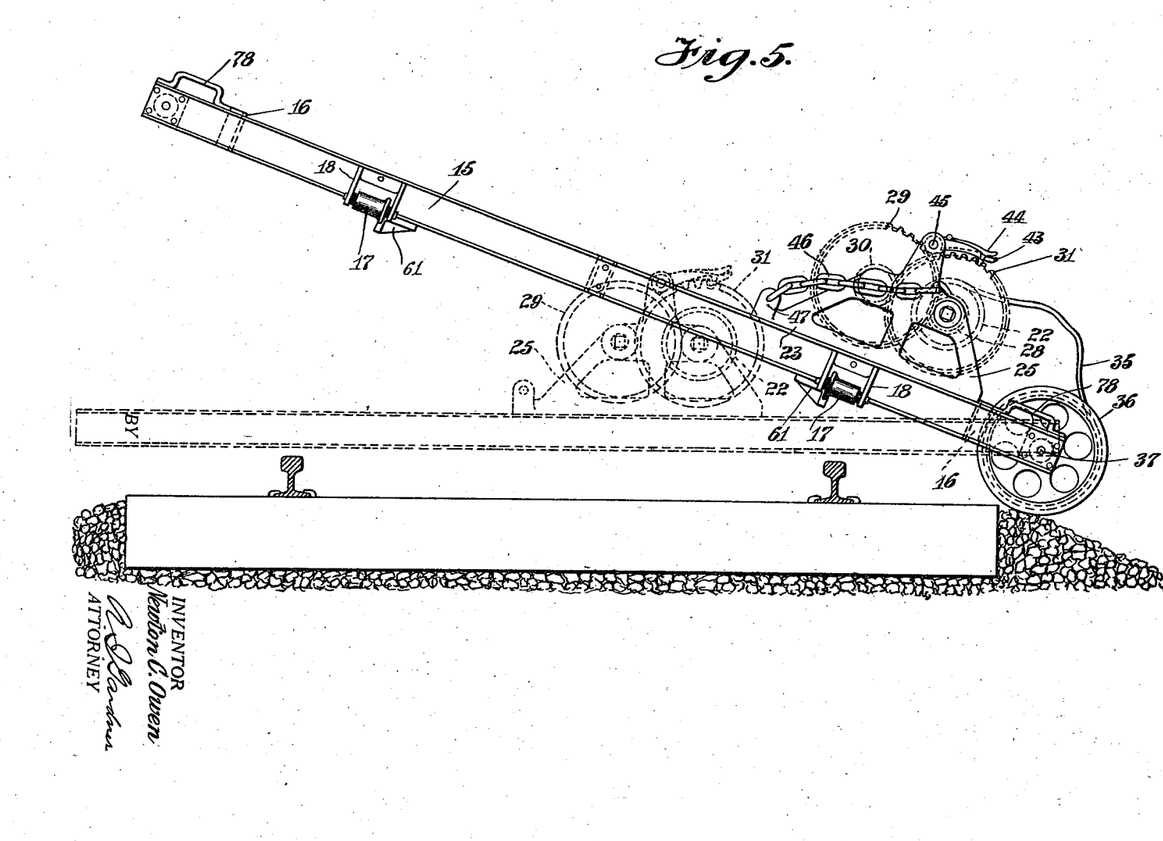
Figure 5 is a side view of this form of the machine as it appears in being removed from the track after the manner of a wheel-barrow.
Figure 6:
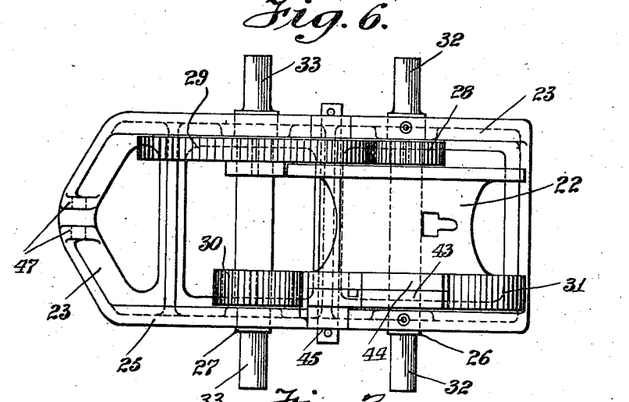
Figures 6 and 7 are plan and side elevation views of the power puller as detached from its support.
Figure 7:
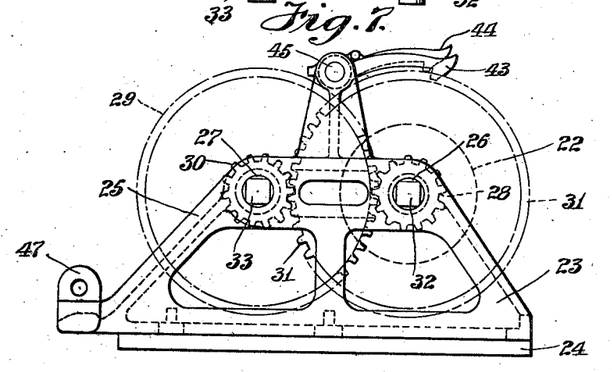
Figure 8:
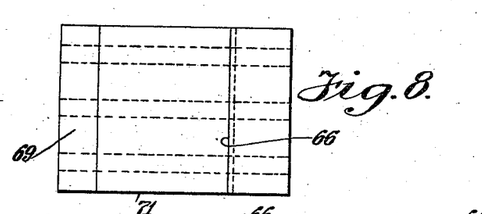
Figure 8 is a plan view and Figures 9 and 10 are edge and end views respectively of a simple form of skid for relieving the pressure between the foot of the rail and the face of the tie.
Figure 9:
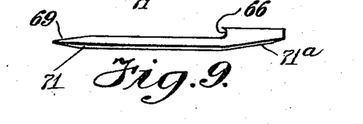
Figure 10:
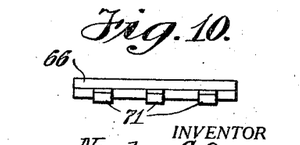

To facilitate handling of the apparatus the truck frame may be provided near its opposite ends with handles 78 secured on top of the beams 15 near the ends of the same, which handles or the braces 16 may serve as stops to limit the sliding movement of the puller when the truck is tilted as in Figure 5. This view illustrates how the truck can be readily handled after the manner of a wheelbarrow, the sheave 36 acting as the supporting wheel to assist in the quick removal of the truck from the tracks.

*Operation.*

The spikes are drawn from the tie which is to be removed and if tie plates have been used these are knocked out and the skids are engaged beneath the rails with their wedge ends facing in the direction in which the tie is to be shifted. The removal of the tie plates ordinarily will provide space for the entry of the skids, but in any event, the wedge-like entering edges of the skids enable them to be readily driven into place. The skids are particularly useful in cases where no tie plates have been used and the rails have sunk more or less in the face of the tie, since they enable the shoulders thus formed in the ties to clear the rails by forcing the ties downward and the rails upward.

The tie hook is engaged about the end of the tie and its parts telescoped to bring them into close-fitting relation on the tie and the cable, after being carried beneath the rails, is either directly attached to the hook, if the form shown in Figures 3 and 4 is employed or in the form of the device shown in Figures 1 and 2, is passed about the guide rollers of the hook, and hooked on to the foot of the far rail. When the rail anchor hook is caught over the ball of the rail the apparatus is ready for the application of power, which may be applied either by ratchet levers, as in Figure 4, or when the elevating pedestal is employed, as in Figure 2, by means of hand cranks long enough to furnish the desired leverage.

As the cable is put under tension the pull on the sheave will produce a thrust on the truck frame which will cause the same to shift laterally, toward the left in Figure 2, until the left hand strut 61 brings up against the inside of the rail head. The loose bearing of the puller on the truck frame and also of the pedestal, when the latter is used, enables the puller and its support to automatically adjust itself upon the truck so that the anchorage pull will come directly on the rails without weakening or straining any parts, and this pull by reason of the gripping of the rail head between the anchorage hook at one side and the strut at the opposite side serves to positively hold the truck down on the rails and to prevent any slipping or travel thereof.

With the cable looped about the end of the tie as in Figure 1 the power is multiplied, due to the pulley effect and the pull being balanced at opposite sides of the tie, with the force applied across the end of the tie, the tie will be withdrawn with a straight line movement. The use of the hand cranks is particularly desirable with this method of connection because they enable a quickening of operation which will more than offset the speed lost through the power multiplying pulley arrangement. Another advantage of this arrangement is that the pull on the rails is applied to both rails, instead of one only, as in Figures 3 and 4, which lessens the possibility of track distortion. In all events the struts or thrust shoulders standing between the rails will operate effectively to prevent gage distortion.

As shown in Figures 1 and 2, the rail hook 50 may be constructed after the manner of the hook element 73 (Figure 3), that is, with a socket designed to receive the ferrule on the end of the cable. This enables the ready attachment and detachment of the hook and permits of the cable being readily passed beneath the rails and the hook being connected with the end of the cable after the cable has been placed fully in position.

What I claim is:

1. In a repair device for railroads, the combination with a frame having wheels for supporting the same transversely on the rails of a railroad, a sheave journaled at one end of the frame, a power device supported on the frame and having a flexible connection for passage over the sheave, a rigid thrust shoulder dependent from the frame in position to engage the side of one of the rails of the railroad to carry the lateral thrust exerted by the frame due to the tensioning of the flexible connection over the sheave, and anchorage means for the power device for connection with the opposite side of the same rail engaged by the thrust shoulder and whereby transverse movement of the repair device with respect to the rail is automatically limited in both directions.

2. The structure of claim 1 in which the operation of the power device is reversible end for end of the frame and in which the frame is provided with a second rigidly dependent thrust shoulder for engagement with the opposite rail on the reversal of working conditions.

3. In a repair device for railroads, the combination with a frame adapted to extend transversely of the rails of a railroad, wheels for supporting the frame on the rails and electrically insulated from the frame, thrust shoulders rigidly dependent from the frame and having rail engaging faces electrically insulated from the frame, a power device mounted on the frame and having an anchorage connection for engagement with one of the rails provided with electrical insulating means, and a tie shifting connection operated by said power device.

4. In railroad repair apparatus, the combination with tie shifting means for removing the ties from beneath the rails, of means insertable between the rails and the ties being removed for reducing the friction between ties and rails.

5. In railroad repair apparatus, a tie hook adjustably engageable about the end of a tie and a roller carried thereby for guiding the loop of a flexible connection about the end of a tie.

6. In railroad repair apparatus, a tie hook comprising collapsibly related hook sections engageable with the end of a tie and having means for guiding the loop of a flexible connection thereabout which will automatically bring the hook sections together about the end of the tie.

7. In railroad repair apparatus, the combination with means for removing the ties from beneath the rails, of skids engageable between the rails and the ties being removed to reduce friction therebetween during the tie-removing operation.

8. In apparatus of the character disclosed, a skid for reducing friction between a railroad rail and a tie being removed from thereunder, said skid having a part for engagement with the rail to temporarily anchor the skid thereto during the tie removing operation.

9. In apparatus of the character disclosed, a skid for reducing friction between a railroad rail and a tie being removed from thereunder, said skid having a part for engagement with the rail to temporarily anchor the skid thereto during the tie removing operation and having a roller for bearing on the tie during such operation.

10. In railroad repair apparatus, a tie hook comprising cooperating hook sections engageable about the end of a tie and provided with cable holding means for causing a cable engaged therewith to automatically clamp the hook sections in self-adjusting engagement with the end portion of a tie.

11. In railroad repair apparatus, the combination with a support adapted to be mounted transversely of a railway and carrying a sheave disposed to stand at one side of the railway, a power puller mounted on the support, a flexible cable connected with said power puller and extending over the sheave beneath the rails to the opposite side of the railway, means for guiding a looped portion of said cable about the end of a tie at said opposite side of the railway and means for connecting the free end of said cable to the rail at said first side of the railway.

12. In railroad repair apparatus, the combination with a support adapted to be mounted on the rails of a railroad, of a power device mounted on said support and provided with substantially horizontal actuating shafts having operating ends exposed for engagement at the opposite sides of said device and means for connecting said power device with the ties.

13. In railroad repair apparatus, the combination with a support adapted to be mounted on the rails of a railroad, a power device removably engageable on said support and a pedestal adapted to be mounted on the support beneath the power device to lift the same above the level of the support.

14. The structure of claim 13 with long leverage hand cranks adapted for operative connection with the power device.

15. In railroad repair apparatus, the combination with a support adapted to be mounted on the rails of a railroad, of a pedestal removably engageable on said support and a power device removably supported on said pedestal.

16. The structure of claim 15 in which the power device is interchangeably engageable on the pedestal or directly on the support and in which means are provided for operating the power device in either of such locations.

17. In railroad repair apparatus, the combination with a support adapted to be mounted on the rails of a railroad, of a pedestal slidably mounted on said support and a power device slidably mounted on the pedestal.

18. The structure of claim 17 with an anchorage connection adapted to extend from the power device in one direction down over the pedestal to one of the rails and a flexible connection adapted to extend from the power device down over the pedestal in the opposite direction.

19. In railroad repair apparatus, the combination with a truck frame provided with handles at the opposite ends of the same and a power device mounted on the frame and slidable thereon between said handles.

20. In railroad repair apparatus, the combination with a supporting frame adapted to be mounted transversely of the rails of a railroad, of a power device supported on the frame and having dependent flanges slidingly guiding the same thereon.

21. In railroad repair apparatus, the combination with a supporting frame adapted to be mounted transversely of the rails of a railroad, of a carriage slidably supported on said frame and a drum and operating gearing mounted in said carriage and having operating shaft ends exposed at opposite sides of the carriage.

22. The structure of claim 21 with operating levers detachably and interchangeably engageable with the thus exposed ends of the shafts.

23. In railroad repair apparatus, the combination with a support adapted to be mounted on the rails of a railroad, of a power device carried thereby and provided with means for connecting the same with the ties and skids for engagement between the foot of the rails and the faces of the ties to relieve friction between the rails and ties.

24. In railroad repair apparatus, the combination with means for pulling the ties from beneath the rails, of skids engageable beneath the rails to reduce the friction between the rails and ties during the tie-pulling operation.

25. The structure of claim 24 in which the skids are equipped with rollers to further reduce friction between the rails and ties.

26. The structure of claim 24 in which the skids have wedge faces at their entering edges.

27. The structure of claim 24 in which the skids are slotted to engage over the flanges of the rails.

28. The structure of claim 24 in which the skids have bearing elements for engagement with the heads of the rails.

29. In apparatus of the character disclosed, a skid for engagement between the foot of a rail and the face of a tie having a claw adapted to fit over the flange of the rail and a wedge face to pass beneath the foot of the rail.

30. In apparatus of the character disclosed, a skid for engagement between the foot of a rail and the face of a tie having a claw adapted to fit over the flange of the rail, a wedge face to pass beneath the foot of the rail and a roller journaled in the skid and projecting below the lower face of the same for rolling contact with the top of the tie.

31. In railroad repair apparatus, a tie hook comprising collapsible hook sections telescopically engageable about the end of a tie.

32. In railroad repair apparatus, a tie hook comprising collapsible hook sections telescopically engageable about the end of a tie, said hook sections being relatively wide to gain a wide bearing on the tie and having points for penetrating the tie.

33. In railroad repair apparatus, a tie hook comprising collapsible hook sections telescopically engageable with the end of a tie and guide sheaves journaled at the corner portions of the hook sections.

34. In railroad repair apparatus, a tie hook comprising collapsible hook sections telescopically engageable with the end of a tie, guide sheaves journaled at the corner portions of the hook sections and an intermediate sheave journaled between the corner sheaves.

35. In railroad repair apparatus, a tie hook comprising angular hook members each engageable about a corner of a tie and having interfitting shank portions slidably engageable across the end of a tie.

36. In railroad repair apparatus, a tie hook comprising angular hook members each engagable about a corner of a tie and having interfitting shank portions slidably engageable across the end of a tie, said hook members having means for passing a cable thereabout to draw the two sections together.

37. In railroad repair apparatus, a truck frame, a tie puller mounted thereon and means for insulatably supporting the truck on the rails of a railroad comprising supporting rollers for engagement with the rails and shafts for said rollers mounted in insulating bushings fixed in brackets carried by the truck frame.

38. In railroad repair apparatus, the combination with a support adapted to be mounted on the rails of a railroad, a sheave journaled at one end of the support, a power device mounted on the support and a flexible connection adapted to be extended from said power device over the sheave and beneath both rails, provided with means for looping the same about the end of a tie and provided with means for attachment to the far rail.

39. The structure of claim 38 with means for guiding the looped portion of the flexible connection in free running relation about the end of the tie.

40. In railroad repair apparatus, the combination with a support adapted to the mounted on the rails of a railroad, a power device mounted on said support, a tie hook engageable with the end portion of a tie and provided with means for guiding a cable about the end of such a tie and a cable extending from the power device about said tie hook and provided with means for connecting the same with one of the rails.

41. In railroad repair apparatus, the combination with a support adapted to be mounted on the rails of a railroad and a power device mounted on said support, of a thrust shoulder on the support and provided with a metal shod insulated contact face for engagement with one of the rails.

42. In railroad repair apparatus, the combination with a truck frame provided with handles for lifting the opposite ends of the same and with a power puller having a cable, of a sheave for the cable journaled in one end of the frame and adapted by engagement with the ground to serve as a rolling support for the frame when the opposite end of the frame is lifted by the handles.

43. In railroad repair apparatus, the combination with means for pulling the ties from beneath the rails, of friction reducing means insertable between the rails and the ties being withdrawn.

44. In railroad repair apparatus, the combination with means for pulling the ties from beneath the rails, of friction reducing means insertable between the rails and the ties being withdrawn and comprising a skid having an inclined lower face for engagement with the face of the tie.

45. In railroad repair apparatus, a tie hook adustably engageable about the end of a tie and provided with means for guiding the loop of a flexible connection around the end of the tie.

46. In railroad repair apparatus, a tie hook adjustably engageable about the end of a tie and provided with means for guiding the loop of a flexible connection around the end of the tie and including guiding rollers supported to stand at the corners of the tie.

47. In railroad repair apparatus, a tie hook adjustably engageable about the end of a tie and provided with means for guiding the loop of a flexible connection around the end of the tie and including guiding rollers supported to stand at the corners of the tie and an intermediate guiding roller positioned between the corner rollers.

In witness whereof, I have hereunto set my hand this 15th day of June, 1922.

NEWTON C. OWEN.